W. B. SHILLING.
CORN PLANTER.
APPLICATION FILED DEC. 23, 1918.
1,317,733. Patented Oct. 7, 1919.
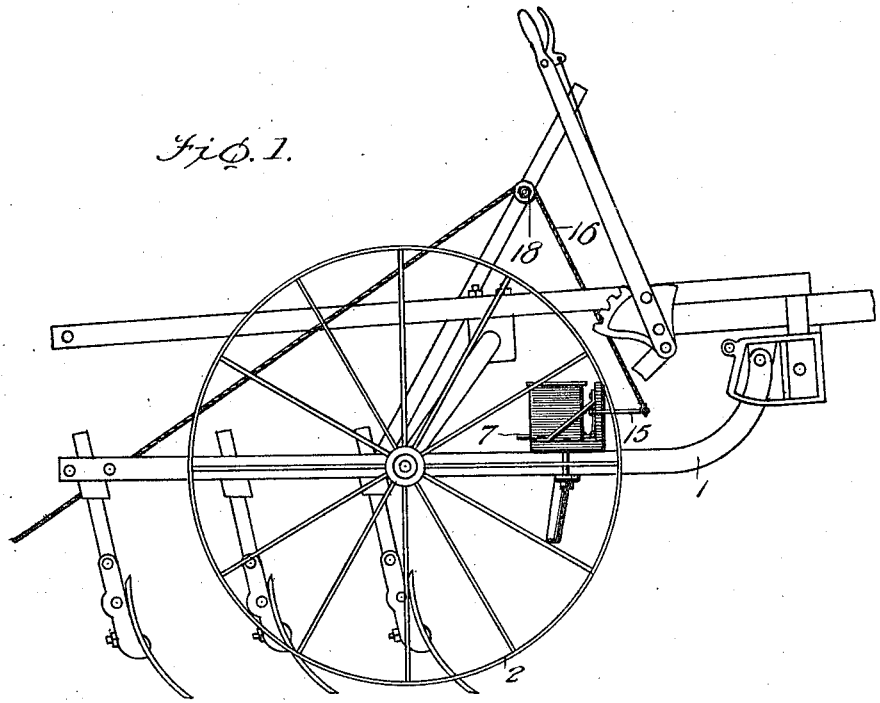
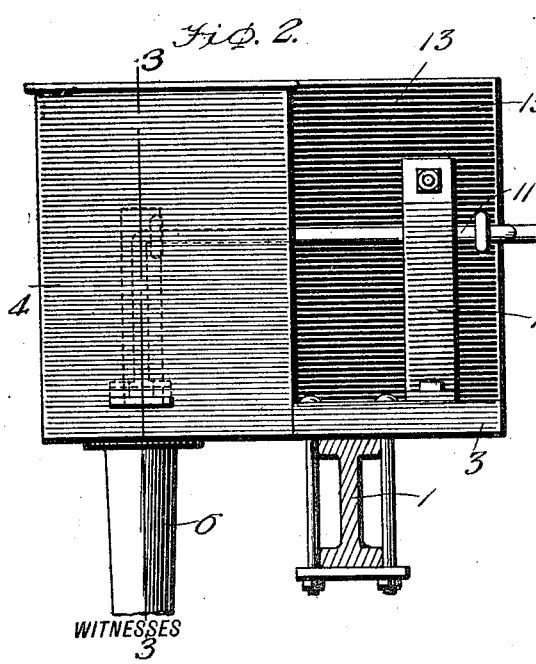
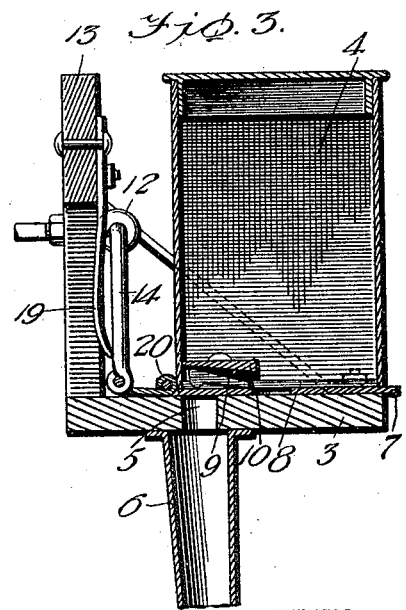
WITNESSES
INVENTOR
William B. Shilling,
BY
ATTORNEYS

UNITED STATES PATENT OFFICE.

WILLIAM B. SHILLING, OF KNOX, INDIANA.

CORN-PLANTER.

1,317,733.

Specification of Letters Patent.   Patented Oct. 7, 1919.

Application filed December 23, 1918.   Serial No. 267,955.

*To all whom it may concern:*

Be it known that I, WILLIAM B. SHILLING, a citizen of the United States, and a resident of Knox, in the county of Starke and State of Indiana, have invented certain new and useful Improvements in Corn-Planters, of which the following is a specification.

My invention is an improvement in corn planters, and has for its object to provide a device of the character specified, adapted for use with cultivators, for replanting, wherein the planter is manually operated to drop the corn wherever desired, that is, wherever a hill is missing.

In the drawings:

Figure 1 is a side view of a portion of a cultivator provided with the improved planter;

Fig. 2 is a rear view of the planter;

Fig. 3 is a section on the line 3—3 of Fig. 2.

The present embodiment of the invention is shown in connection with the shovel frame or beam 1 of a sulky cultivator indicated at 2, and the planter is secured to the beam at the left hand side of the cultivator.

The planter comprises a base 3 of suitable size and upon the base is arranged a hopper or casing 4 for receiving the corn to be planted. This base has an opening 5 through the same, and a chute 6 is secured to the base at the opening, the opening communicating with the hopper 4.

A slide or cut off 7 is movable in the hopper transversely of the chute for closing the opening, and this slide has an opening for receiving a predetermined number of grains of corn, and for afterward delivering them to the opening 5. The slide 7 moves in guides 8, and a scraper 9 is provided for scraping off the excess grains from the slide as the opening of the slide passes into register with the opening 5.

This scraper 9 is held in place by a cross plate 10 secured to the base at its end, and this scraper has its free edge arranged to move upon the upper face of the slide, to scrape off all of the grains except those in the opening of the slide.

The slide is operated by means of a crank shaft 11 which is journaled in eyes 12 on a plate 13 extending upwardly from the base at the front thereof. The crank shaft has one arm 14 pivoted to the front end of the slide, and the other arm 15 has connected therewith one end of a flexible member 16 for operating the crank shaft. This plate 13 is braced against the base by an inclined brace 17, and the flexible member 16 passes upwardly over a pulley 18 on the frame of the cultivator, and thence rearwardly to a suitable connection with the frame.

A plate spring 19 is arranged at the front of the arm 14 of the crank shaft to return the slide to normal position, the said spring pushing the slide rearwardly as soon as the traction is relaxed upon the flexible member or rope 16. The slide has a stop rib 20 near its connection with the crank arm 14, for engaging the hopper wall to limit the rearward movement of the slide under the influence of the spring 19.

In operation, whenever the driver notices that a hill of corn is missing he will make traction on the flexible member 16 to operate the slide, to plant a hill of corn. The cultivator shovels will cover the corn dropped. The device is especially intended for replanting corn.

I claim:

A dropping device comprising a base plate, a hopper on the base plate, a vertical plate arranged at one edge of the base plate and spaced apart from the hopper, a shaft journaled on the vertical plate and having a depending arm at the hopper, dropping mechanism in connection with the hopper and connected with the arm, a spring normally pressing the arm toward the hopper, said shaft having at the other end an arm adapted for connection with mechanism for oscillating the shaft.

WILLIAM B. SHILLING.

Witnesses:
ORVILLE W. NICHOLS,
H. L. HOSTETTER.

Copies of this patent may be obtained for five cents each, by addressing the "Commissioner of Patents, Washington, D. C."